United States Patent [19]
Poupitch

[11] 3,842,710
[45] Oct. 22, 1974

[54] REMOVABLE RIVET
[75] Inventor: Ougljesa Jules Poupitch, La Jolla, Calif.
[73] Assignee: Illinois Tool Works Inc., Chicago, Ill.
[22] Filed: Oct. 1, 1973
[21] Appl. No.: 401,007

Related U.S. Application Data
[63] Continuation of Ser. No. 179,378, Sept. 10, 1971, abandoned.

[52] U.S. Cl. .......................... 85/37, 29/509, 29/522
[51] Int. Cl. ............................................. F16b 19/04
[58] Field of Search ........... 85/37, 39, 70, 35, 4, 77, 85/82, 83, 1 P, 32 K; 29/509, 522–523, 512; 10/86 R, 86 F; 151/41.72, 41.74, 69, 68; 52/758 D, 758 F

[56] References Cited
UNITED STATES PATENTS

| | | | |
|---|---|---|---|
| 633,537 | 9/1899 | Stewart | 85/70 X |
| 990,581 | 4/1911 | Neider | 29/512 X |
| 1,385,799 | 7/1921 | Smith | 85/37 |
| 1,798,468 | 3/1931 | Hartzler et al. | 85/32 K X |
| 2,321,379 | 6/1943 | Green | 85/46 |
| 2,348,589 | 5/1944 | Auten | 85/82 |
| 2,393,564 | 1/1946 | Poupitch | 85/37 |
| 2,535,079 | 12/1950 | Lebert | 29/512 X |
| 2,594,840 | 4/1952 | Allison | 52/758 D |
| 2,829,696 | 4/1958 | Wagner | 151/69 |
| 2,914,106 | 11/1959 | Boyd | 85/70 |
| 3,193,921 | 7/1965 | Rahn | 29/509 |
| 3,322,449 | 5/1967 | Becker | 52/758 F |
| 3,463,046 | 8/1969 | Welch et al. | 151/41.72 X |
| 3,505,921 | 4/1970 | Wigam | 151/68 X |

*Primary Examiner*—Ramon S. Britts
*Attorney, Agent, or Firm*—Robert W. Beart; Thomas W. Buckman

[57] ABSTRACT

A removable rivet assembly comprising a screw member with a threaded shank and driving head portions operatively associated with a deformable sleeve portion. The sleeve is telescopically arranged over the threaded shank portion and inserted through preformed apertures in workpieces. The sleeve portion is thereafter formed into a rivet head and body to provide a secure yet releasable fastening.

9 Claims, 11 Drawing Figures

PATENTED OCT 22 1974 3,842,710
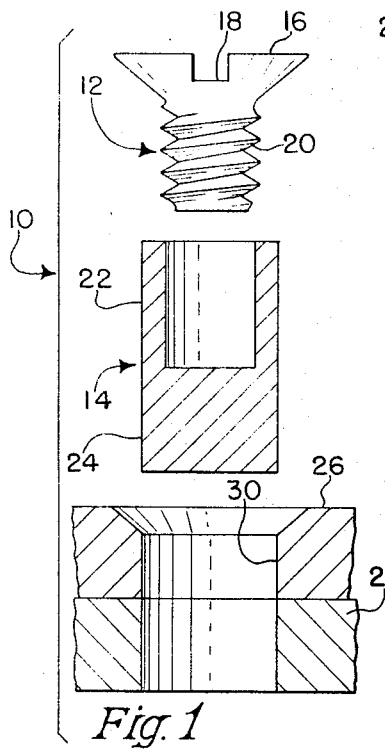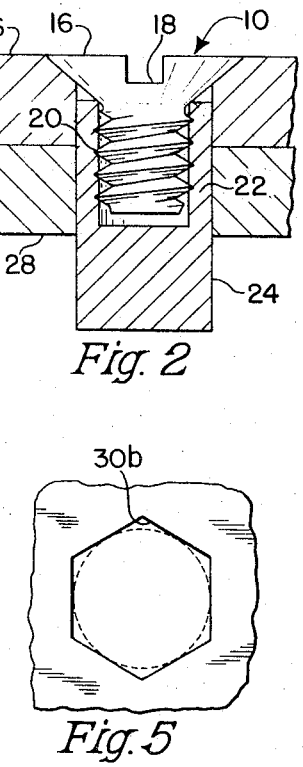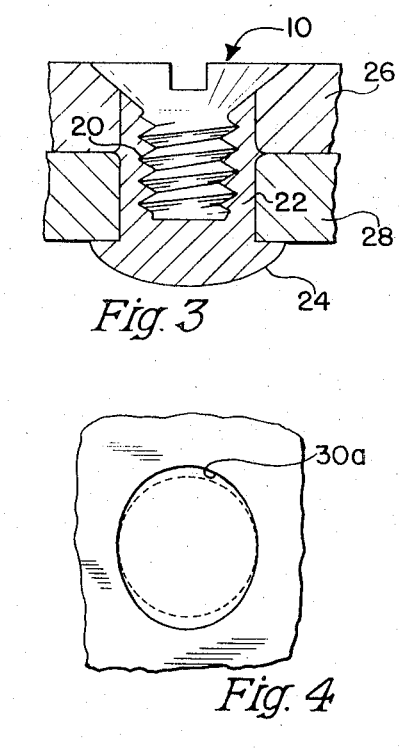
INVENTOR.
Ougljesa Jules Poupitch
BY Thomas W. Buckman
Robert W. Beart
His Att'ys 3,842,710

REMOVABLE RIVET

This application is a continuation of application Ser. No. 179,378, filed Sept. 10, 1971, now abandoned.

BACKGROUND OF THE INVENTION

This invention relates generally to a rivet fastener and more particularly concerns a rivet fastener which may be removable.

There are many instances requiring the use of a rivet fastener which simultaneously requires at least a selectively removable fastener. Rivet type fasteners tend to allow high production rates in assemblies and have the capability to fasten dissimilar metals and assemblies having a number of parts with non-uniform thicknesses. Also, initial and maintenance costs for rivet type equipment are generally low. However, a typical rivet fastening has a disadvantage in that the parts once fastened cannot easily be disassembled.

Prior art efforts to provide a rivet fastener with a removability characteristic have been futile and generally rely on a mandrel to upset a hollow type rivet. These prior art rivets do not tend to maximize production rates because of the rather slow upsetting process involved and are not adaptable for automatic riveting machines.

SUMMARY OF THE INVENTION

It is an object of this invention to provide a fastener system which can be applied as a rivet and yet having a portion of the combination removable as a threaded fastener.

It is another object of this invention to provide a pre-assembled removable rivet unit.

These and other objects and advantages are obtained by a fastener unit which includes a screw body having an enlarged head portion associated with a deformable sleeve member. The threaded shank portion of the screw body is telescopically associated with the sleeve member and may be mechanically pre-assembled therewith. The lowermost portion of the deformable sleeve body is deformed into a rivet head after insertion through an appropriate aperture. The screw body thereafter may be readily removed from the joint by applying the appropriate rotary motion to the head of the screw.

Other objects and advantages of the invention will become apparent upon reading the following detailed description and upon reference to the drawings.

BRIEF DESCRIPTION OF THE DRAWINGS

FIG. 1 is an exploded view of a fastener system incorporating features of the present invention.

FIG. 2 is a sectional view of the fastener system after it has been inserted through apertures in appropriate workpieces.

FIG. 3 is a sectional view similar to FIG. 2 after the sleeve portion of the present invention has been deformed into a rivet head.

FIGS. 4–6 are top views of apertures in workpieces into which the fastening system may be inserted to assure non-rotatability of the sleeve after the sleeve has been deformed.

FIG. 7 is a sectional view showing a modified form of the system.

FIG. 8 is a sectional view showing still another form of the fastener system of the present invention.

FIG. 9 is a bottom plan view of the fastener system in FIG. 8.

FIG. 10 is a sectional view of yet another modified form of the fastener system of the present invention.

FIG. 11 is a sectional view of the system shown in FIG. 10 after the sleeve portion has been deformed.

DETAILED DESCRIPTION OF THE INVENTION

Referring now more specifically to the drawings wherein like parts are designated by the same numerals throughout the various figures, a fastener unit 10 incorporating features of the present invention is shown in FIGS. 1–3 in various stages of assembly. The unit 10 is comprised of a screw body 12 which includes an enlarged driving head portion 16 with appropriate tool engaging means 18 for effecting rotary motion thereto, and a threaded shank 20. Associated with the screw body 12 and more particularly with the threaded shank 20 is a deformable cylindrical body 14 which includes a sleeve portion 22 and a head portion 24.

The screw 12 and deformable body 14 may be pre-assembled by a force-fit of the threaded shank 20 into the blind bore forming the sleeve 22 or initially forming mating internal thread convolutions in the sleeve 22.

The unit 10 may best be utilized in conjunction with a preformed aperture which generally is comparable in shape and size to the size of the body 14. An aperture 30 is shown formed in workpieces 26 and 28 to appropriately receive the fastener unit 10. FIG. 2 shows the unit as it is inserted through the workpiece or workpieces. In FIG. 3, the fastener unit is shown securely connecting workpieces 26 and 28 after the deformable head portion 24 has been formed into a rivet head using normal and accepted riveting practices. It should be noted that the axial stress exerted on the body 14 as a result of the deforming process forces the sleeve 22 to cold flow material to conform with mating surfaces of the screw body 12. Thus, internal thread convolutions are formed or completed which allows the body 12 at a subsequent and desired moment to be removed from the body 14 upon application of the appropriate rotary forces in an appropriate direction to the screw. The flowing of the sleeve material also provides further resistance to axial separation of the two bodies 12 and 14.

While the compression of the sleeve material during heading could provide enough frictional resistance to prevent relative rotary motion between the body 14 and the workpieces 26 and 28, it may be desirable to provide additional means to the system to prevent rotation of the sleeve body relative to the workpiece. This may be accomplished by providing the workpiece or workpieces with an aperture having a shape which does not conform to the original cross-sectional shape of the sleeve body 14 prior to the riveting operation. Examples of these non-conforming shapes are shown in FIGS. 4–6 and are represented by apertures 30a, 30b and 30c. While these non-conforming, generally non-circular shapes allow the unit to be readily inserted, the deformation of the head 24 will allow material to flow at least partially into the areas outside of the dotted lines in FIGS. 4–6. These dotted lines generally represent the outline of the body 14 prior to deformation. It should then be apparent that any forces tending to rotate the sleeve 14 will be resisted by the deformed rivet body in conjunction with the non-circular apertures.

Certain applications of the invention may require removability of a fastening unit and yet require a limitation on the ease of this removability. Therefore, one of the features of the invention is the provision of means limiting the removability of the screw from the body. As best shown in FIG. 7, a fastener unit 10a may be provided with a screw member 12a having a non-threaded under sized shank portion 34 between a threaded terminal shank portion 20a and the head 16a. In operation, the unit 10a could be formed in a manner similar to that described above. The sleeve portion 22a will flow under the pressure exerted by the heading or riveting process to such an extent that removal of the fastener 12a will require the formation of threads in the uppermost portion of the inner surface portion of the sleeve 22a. This can be accomplished by utilizing the conventional thread-forming convolutions of a hardened screw element of the threaded portion 20a where the sleeve portion is of a softer material. The conforming portions of the sleeve 22a and the threaded portion of screw 20a will give the necessary cooperative motion to the thread fastener as it is rotated for removal to result in internal threads being formed or cut as shown in dotted lines in FIG. 7 upon the application of the appropriate torque to the head of the fastener.

After the screw members 12 become disassociated from the deformed sleeve member 14 in any of the embodiments, it may be desirous to insure that the sleeve 14 does not drop out of the aperture. This purpose may be achieved by the flowing of the material in the sleeve between adjacent workpieces 26 and 28 which I have found occurs in most installations by reason of the forces applied to the sleeve 22a in the riveting operation. The ability of the body 14 to remain in the aperture may further be enhanced by slightly modifying the shape of the aperture in the upper panel 26c relative to the shape of the aperture in panel 28c, as indicated by aperture 32 shown in FIG. 8.

In carrying out other aspects of the invention, a relatively high shear-resistant fastener may be provided as shown in FIGS. 10 and 11. Fastener unit 10b includes a screw portion 12b having a threaded shank portion 20b and further includes a deformable sleeve 14b generally consistent with the description of the preferred embodiments above. The screw portion 12b may, however, include an unthreaded shank portion 36 directly beneath and adjacent the head 16b of a size generally conforming to the size of the aperture provided in the complementary workpieces 26b and 28b, a reduced shank portion 20b is associated with the internal bore of the deformable portion 14b in a manner consistent with the above description. In this embodiment, the screw portion provides a maximum cross-sectional area of a fastener body relative to the size of the aperture in both workpieces 26b and 28b in an attempt to maximize the shear-resistance of the fastening and thereby provide an adequate anti-shear body portion.

It should be understood that any manner of upsetting the head portion 24 may be utilized and still come within the scope of the invention. In this manner, FIGS. 8 and 9 show a selective staking procedure in which a plurality of areas 38 are deformed to provide the necessary rivet head while also allowing the material in the sleeve to flow to generally conform to the surface of the threaded shank 20c.

Thus, it is apparent that there has been provided in accordance with the invention, a removable rivet fastening system that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A preassembled removable rivet unit comprising a first bolt-like element including a radially enlarged head portion at one end thereof and a threaded shank portion at the other end thereof, a second element comprising a deformable sleeve member including a blind bore of a length at least as great as that of the threaded portion of the shank, the sleeve member telescopically retained in threaded association with the threaded shank portion of the bolt, a solid extremity of the sleeve opposite the bore being of substantial length and extending axially beyond the terminal portion of the bolt element to enable said extremity to be formed into a rivet head by upsetting, the sleeve member having a substantially uniform diameter throughout its axial extent, said uniform diameter being less than the diameter of the enlarged head portion.

2. A removable fastener in accordance with claim 1 wherein the first element includes an unthreaded shank portion between the head portion and threaded shank portion.

3. A removable fastener unit in accordance with claim 1 wherein said first element includes an unthreaded shank portion between the head portion and threaded shank portion, the unthreaded shank portion having a diameter at least equal to the crest diameter of the threaded portion of said shank and substantially equal to the preformed aperture in the complementary panel of a workpiece with which it is adapted to be associated thus providing a fastener with high resistance to shear forces relative to said complementary panel.

4. A removable fastener unit in accordance with claim 1 wherein said first element includes an unthreaded shank portion between the threaded shank portion and the head portion having a diameter smaller than the crest diameter of the thread in said threaded portion, said sleeve portion telescopically surrounding both of said shank portions whereby the formation of the rivet head forces the sleeve material aggressively against the shank portions in such a manner whereby upon intentional removal of said first element relative to said second element said first element must form threads in said second element to be retracted and removed.

5. A removable rivet assembly for use in combination with preformed apertures in workpieces, including a screw member with a radially enlarged head portion at one end and a threaded shank portion at the opposite end, a deformable cylindrical sleeve member preassembled on said opposite end, the sleeve including a tubular portion of a length as least as great as that of the threaded portion of the shank threadingly engaging the threaded shank, a solid portion of substantial length integrally formed at one end of the tubular portion and extending axially beyond the extremity of the threaded shank thus providing means for forming a rivet head while allowing the screw member to be selectively removed from the sleeve and workpiece by unthreading the bolt from the sleeve, the outer diameter of the cylindrical sleeve member being substantially uniform throughout its axial extend and being less than the maximum lateral dimension of the enlarged head portion to allow the preassembled sleeve to be inserted through an aperture in the workpiece prior to the formation of the rivet head.

6. The system as described in claim 5 wherein the cross-sectional configuration of the aperture in the complementary workpiece is non-circular to prevent rotation of the sleeve relative to the complementary workpiece upon removal of the screw member therefrom.

7. The system as described in claim 5 wherein the aperture includes means to prevent removal of the sleeve from the complementary workpiece after the rivet head has been deformed and after removal of the screw member from the sleeve.

8. A method of providing a selectively removable structural joint including the steps of threadedly preassembling a relatively hard screw body having an enlarged head and a threaded shank portion to a softer sleeve member having a blind bore therein which surrounds the threaded shank portion and the extremity of the screw opposite the head by the threaded shank engaging complementary threads in the sleeve, inserting the screw and sleeve preassembly through an aperture in a workpiece until the head of the screw body abuts one side of the workpiece, radially swaging by external axial forces the portion of the sleeve which covers the extremity of the screw opposite the head into a radially enlarged rivet head to abut the opposite side of the workpiece, whereby the resulting rivet connection may be selectively disassembled by rotating the screw relative to the sleeve.

9. A method in accordance with claim 8, wherein a portion of the sleeve is deformed around the threaded shank portion forming the complementary threads thereto while the radially enlarged head clampingly engages the complementary workpiece.

* * * * *